June 29, 1937. C. R. LARSON 2,085,030
AUTOMATIC SYNCHRONOUS CLUTCH AND BRAKE CONTROL
Filed March 15, 1933 2 Sheets-Sheet 2
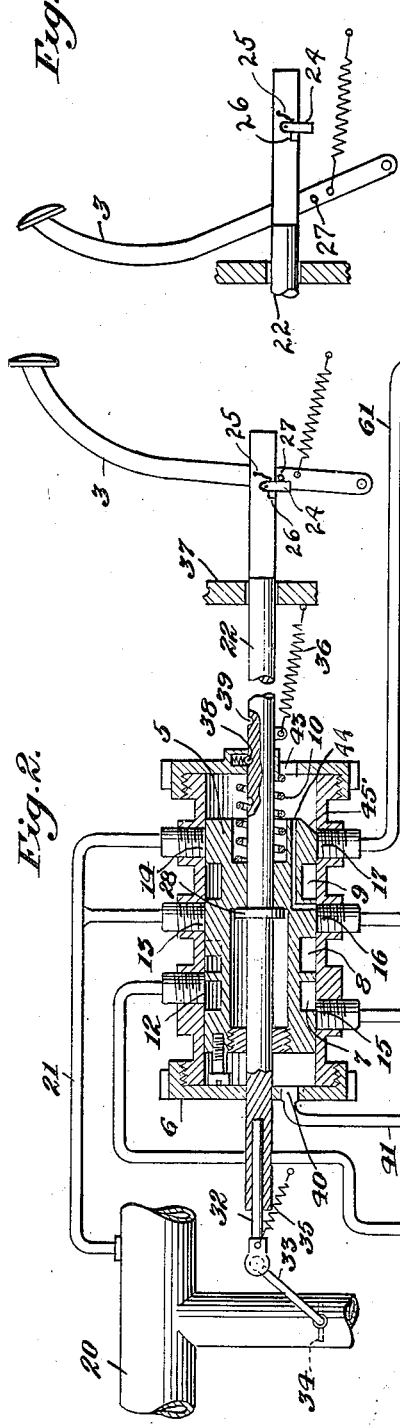
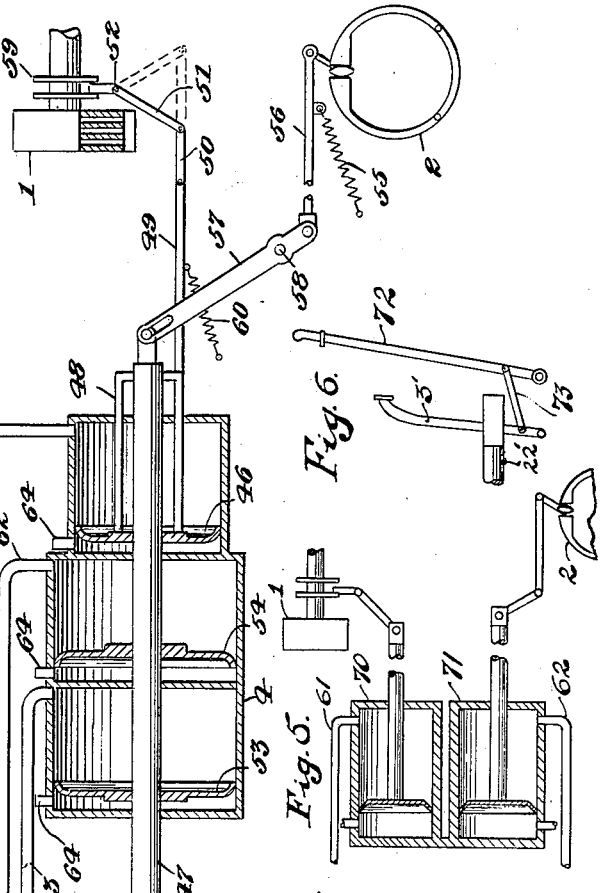
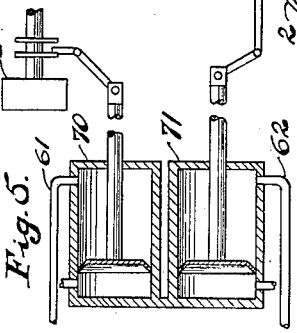
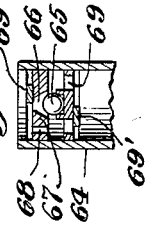
Inventor:
C. R. Larson,
Raymond Jones
Att'y.

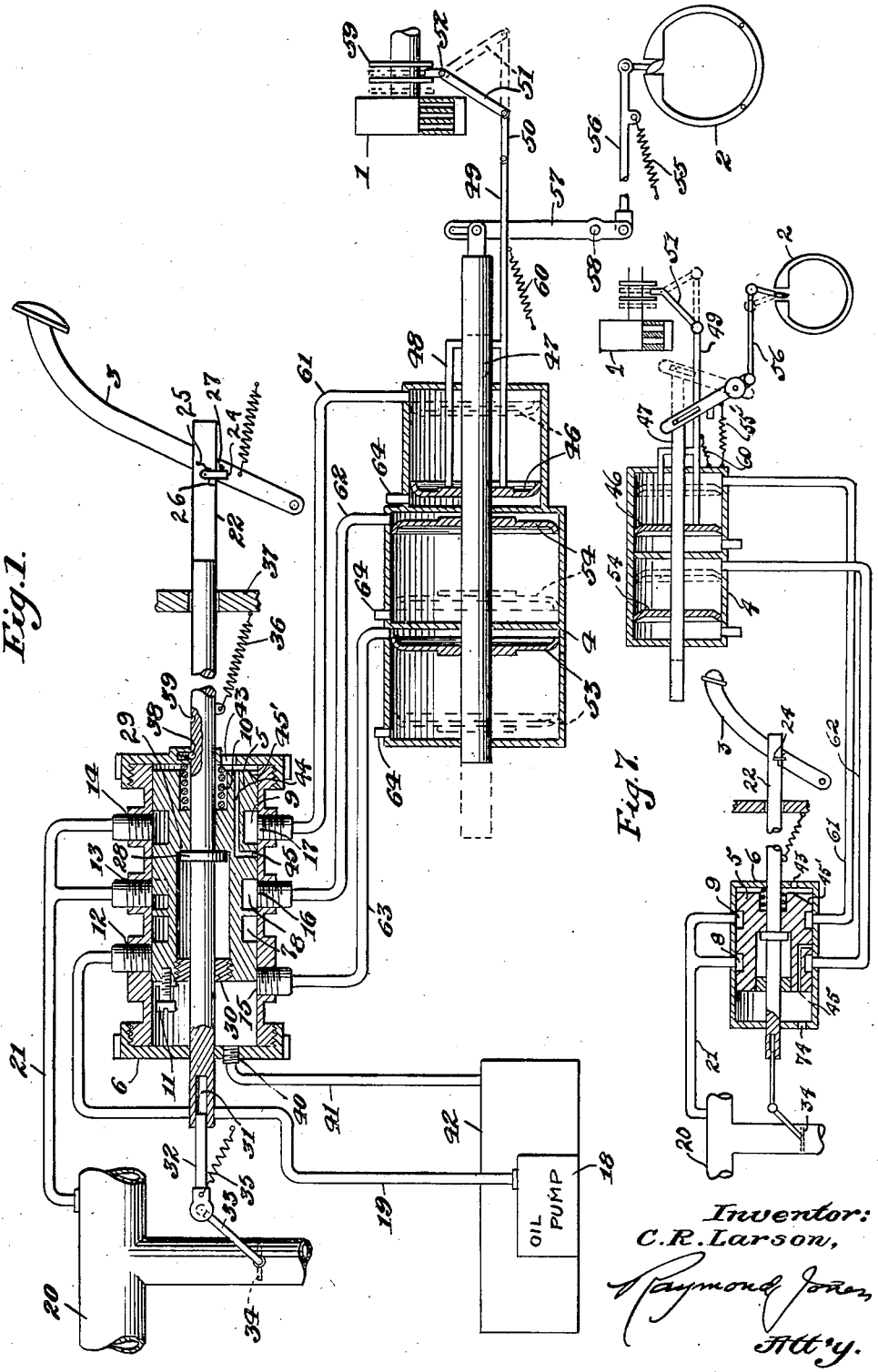

Patented June 29, 1937

2,085,030

UNITED STATES PATENT OFFICE 2,085,030

AUTOMATIC SYNCHRONOUS CLUTCH AND BRAKE CONTROL

Carl R. Larson, Chicago, Ill., assignor, by mesne assignments, to Airdraulic Brake Control Corporation, a corporation of Wisconsin Application March 15, 1933, Serial No. 660,917

21 Claims. (Cl. 192—.01)

My invention relates to an automatic synchronous clutch and brake control, and more particularly to a means for operating the clutch and brakes of an automobile in a predetermined sequence in response to movements of the accelerator pedal.

The main object of my invention is to eliminate all direct manual control of the clutch and brakes, and to provide an automatic operation of the clutch and brakes in response to movements of the accelerator pedal.

Another object is to provide a means for operating a clutch and brake wherein the power for operating the same is derived from the vehicle engine.

Another object is to provide a unitary power device for operating a clutch and brake that is responsive both to fluid pressure and suction derived from the vehicle engine, or to suction alone.

Another object is to provide a safety means in a device of the character described which is effective to stop the vehicle in the event of inadvertent excessive application of the control pedal.

Another object is to provide an automatic clutch and brake control that is positive and safe in operation, simple, compact, and sturdy in construction, and which is economical to manufacture and install.

Other objects will become apparent from the specification which follows, and from the accompanying drawings which show a preferred form of my invention and wherein—

Figure 1 is a view, partly in section, in conventional form of the related parts showing the position of parts with the engine dead and the clutch and brake engaged;

Fig. 2 is a view, partly in section, showing the relative positions of parts at the instant of engaging the clutch and fully releasing the brakes;

Fig. 3 is an enlarged view showing in detail a safety device associated with the control pedal;

Fig. 4 shows a detail of an air vent;

Fig. 5 shows a modified form of brake and clutch control cylinder;

Fig. 6 shows a remote control lever for the accelerator pedal, and

Fig. 7 shows a modified form of valve cylinder and parts operated thereby.

The herein described clutch and brake control is an improvement over that disclosed in my copending application, Serial No. 609,722, filed May 6, 1932, and has been designed to provide a control that is more effective, positive, and speedier in operation, and wherein the component parts have been simplified and reduced to a minimum.

Referring to the drawings in detail, I have shown in conventional form a clutch 1, a brake 2, and an accelerator pedal 3. Control of the clutch and brake is derived from pistons housed in a piston casing 4. The inlet ports of the casing 4 are supplied with fluid pressure and suction derived from the engine through a multiple valve 5 located in its casing 6.

The piston valve 5 is provided with one circular fluid pressure port 7 and two fluid suction ports 8 and 9. A spring 10 acts at all times to urge the valve 5 to the left in Fig. 1, one end of this spring being in engagement with the end wall of casing 6. An adjustable valve stop 11 on the valve 5 is arranged to contact the left hand end wall of casing 6. The casing 6 is provided with one fluid pressure inlet port 12 and two fluid suction inlet ports 13 and 14. Corresponding to these inlet ports are outlet ports 15, 16 and 17.

The lubricating oil pump 18 furnishes fluid pressure through a conduit 19 to port 12, and the intake manifold 20 of the engine furnishes suction through a conduit 21 to the ports 13 and 14. The operation of the valve 5 is permissive to the left through spring 10, while the valve is returned to the right by means of a control rod 22 which is moved to the left by the pedal 3, and moved to the right by a spring 36. For a purpose to be described, the pedal 3 engages the rod 22 through a pivoted dog 24. A light spring 25 acts to releasably retain the dog against a stop lug 26. A pin 27 engages the dog on the rod 22 to move the rod to the left.

The valve 5 is bored axially to receive the rod and a collar 28 fixed to rod 22 engages a shoulder 29 on the valve. A bushing 30 slidably engages rod 22 and is screw threaded into the left end of the axial valve bore and serves to prevent oil from passing into the bore. The free end of rod 22 is bored axially at 31 to receive the throttle rod 32 slidably. The rod 32 is pivotally connected to the throttle link 33 which operates throttle valve 34. A throttle rod spring 35 acts to return the throttle to its off position. A spring 36 is connected to the rod 22 and to a rod guide 37. The spring 36 is stronger than the spring 10 and serves to compress the latter and return the rod 22 and valve 5 to the right when foot pressure is removed from pedal 3, the collar 28 acting on the valve to return same. A spring pressed ball detent 38 detachably engages recesses 39 in rod 22 and serves to detain rod 22 slightly to prevent jars from the vehicle or slight variations of foot pressure from displacing the valve to positions not intended.

A leak vent 40 in the left end of the casing 6 permits oil to leak back through a conduit 41 to the crank case 42. The opposite end wall of casing 6 is provided with a leak opening 43 which permits air to leak into the right hand end of casing 6 as described later on. A small leak port 44 is drilled in valve 5 and terminates at 45 in the valve face. One end of the valve is cut away at 45' to provide a leak port from the port 17.

A clutch operating piston 46 is slidably mounted on a piston rod 47. The piston 46 is connected through links or rods 48, 49 and 50 to a clutch lever 51 pivoted at 52. A pair of pistons 53 and 54 are connected rigidly to the rod 47 and operate to move the rod to control the brake 2. A strong spring 55 acts to urge the brake rod 56 to the left to retain the brake "on" until it is released by the rod 47 moving to the left. The rod 47 is pivotally connected to a link 57 which rotates on a pivot 58 and is pivoted to the rod 56.

The clutch lever 51 engages the clutch operating collars 59, and a spring 60 acts to urge the rod 49 to the left. Suction from a conduit 61 acts to move the piston 46 to the right and, likewise, suction from a conduit 62 acts to move the piston 54 to the right. The piston 53 and rod 47 are moved to the left by oil pressure from a conduit 63 acting on piston 53.

An air vent 64 is arranged in each compartment of casing 4 behind each piston or on that side opposite to the suction or pressure side. Each vent 64 may be designed to pass a greater amount of air during one stroke of the related piston than during its opposite stroke. A ball 65 may be arranged to close an opening 66 in a wall 67 on one stroke leaving open a small port 68, whereas, on the return stroke, the ball will drop leaving open all of a series of ports 66, 68 and 69. Movable plates 69' serve to regulate port openings.

The operation of a safety device is shown in Fig. 3. In the event that the operator presses the pedal 3 too far down, for example, if he should open the throttle beyond a permissible degree or should he become incapacitated and inadvertently extend his foot forward rigidly, I have provided a "knock-off" between the pedal 3 and rod 22. It will be noted that the pin 27 moves over an arc in a manner to become lowered during down movement of the pedal. When the pedal moves from its Fig. 1 position to its Fig. 3 position, the pin 27 will slip below the dog 24 to free the rod 22 which will be moved to the right by spring 36 to move valve 5 to the right and cut off the gas and apply the brakes. When the pedal is then released, the pin 27 will again engage or snap over the dog 24 in position for another positive operation of the rod 22.

In the operation of my device, reference is had to Fig. 1, which shows the relative positions of parts when the engine is dead, the brake being held engaged by spring 55 and the clutch engaged by the usual springs assisted by the spring 60. The valve 5 is being retained to the right by rod 22 and its collar 28, the spring 36 acting to compress spring 10. When the engine is started and is idling, the clutch piston 46 will be moved to the right, as shown by dotted lines, by means of suction from conduit 21 through ports 14, 9, 17 and conduit 61. The clutch lever 51 will be moved to its dotted position to release the clutch to permit shift of gears. The port 12 is still closed to block off oil pressure to conduit 63. Suction from conduit 21 through ports 13, 8, 16 and conduit 62 acts on piston 54 and retains same to the right or full line position. Hence, the piston 54 assists in engaging the brakes by holding rod 47 to the right and rod 56 to the left, thereby assisting spring 55 to set the brakes.

To permit movement of the vehicle, the operator presses pedal 3 a desired amount to permit valve 5 to move to its extreme left position. The pin 27 through dog 24 moves rod 22 positively while spring 10 causes the valve 5 to follow up to the left to its position in Fig. 2. Oil pressure is now admitted from conduit 19 through ports 12, 7, 15 and conduit 63 to the right of piston 53 to move it to its extreme left position to release the brakes. Any air to the left of piston 53 will leak out of the vent 64. I may select vent ports 66, 68, 69 of any desired relative sizes to afford any modification desired of the speed of brake release or engagement. This will apply to the air vent associated with the clutch piston 46. I may make these vent ports or any of them adjustable as to their opening by means of variable closures 69' of well known form.

When port 15 is opened to port 7, the suction port 17 is substantially closed except for the small cut off port 45'. Hence, the main clutch spring, not shown, and spring 60 will force piston 46 to the left to engage the clutch and air can leak in through vent 43, port 45' and conduit 61 to allow piston 46 a free movement. As piston 53 pulls rod 47 to its left, the piston 54 is moved in the same direction. To admit air to the right of piston 54 during this travel, and while port 16 is closed to suction, air will leak in through vent 43, vent port 44 and conduit 62 to break the vacuum to the right of piston 54. The rod 47 will cause brake rod 56 to move to its right which will tension spring 55 and release the brakes, only one of which is shown at 2.

After the valve stop 11 strikes the left end of casing 6, continued motion of rod 22 will cause the throttle valve 34 to open. This opening has been delayed due to the lost motion connection at 31 between the rods 22 and 32. Any throttle opening can now be given through pedal 3 and rod 22 to vary the engine speed. If the pedal 3 is pushed too far down or to the left, the safety dog 24 will by-pass the pin 27 and the rod 22 will be snapped to the right by spring 36, and the valve 5 will be moved to the right to permit oil to leak from the right side of piston 53 back to the crank case through conduits 63, 41 and port 15 while the spring 55 is acting to set the brakes and return rod 47 to its right hand position. This same operation or setting of brakes will be obtained if the operator slowly releases pedal 3.

I do not desire to be limited to the use of a pair of coaxial cylinders as shown in Fig. 1. Under certain conditions, it may be found practical to mount the pair of cylinders at spaced locations or even in parallel adjacent positions as shown in Fig. 5, which shows a clutch cylinder 70 operably associated with the clutch 1 and supplied by manifold suction from conduit 61 while a brake cylinder 71 is operably associated with the brake 2 and supplied by suction from conduit 62.

Fig. 6 shows a hand accelerator lever 72 which may be mounted adjacent one front door of the vehicle to be within reach of an operator standing on a running board. The lever 72 is connected through a suitable linkage 73 to the foot accelerator 3' whereby both levers are operably associated with the accelerator rod 22' which is connected to the valve 5 of Fig. 1.

The modification of Fig. 7 is of a simplified and cheaper construction and offers advantages in the sequence of operation of the clutch, brake, and throttle. In this form, suction only from the manifold is employed for clutch and brake control. The valve 5 has been modified to eliminate the pressure port 7 and the suction ports 8 and 9 are used to control action of suction from manifold conduit 21 to either the clutch piston 46 through conduit 61 or the brake piston 54 through conduit 62. While in Fig. 1 the brake is disengaged by pressure on piston 53; I prefer, as shown in Fig. 7, to employ a spring 55' to maintain the brake disengaged. It is important to note in Fig. 7 that the sequence of operation is modified. The full lines show the relative positions of parts when the engine is dead, the clutch being held engaged by spring 60 and the brake 2 is held disengaged by the spring 55'. Of course, the usual auxiliary emergency brake of the vehicle may be applied at any time desired.

In the operation of the device of Fig. 7, as soon as the engine is started and manifold suction is built up, this suction through the ports 8 and 9 acts immediately upon both pistons 46 and 54 to move clutch rod 49 and brake rod 47 to the right to disengage the clutch and engage the brake, the pedal 3 being in its full forward position. The gears may be shifted into first or low drive. To advance the vehicle, the foot lever 3 is pushed down slightly to advance the vlave 5 to cut off suction from ports 8 and 9 and pistons 46 and 54. The spring 60 will cause the clutch to engage and the spring 55' will cause the brake to disengage. The admission of gas through forward motion of lever 3 is properly timed to gradually accelerate the vehicle as the clutch is engaged. The "gas fed stroke" of the rod 22 is the same for Figs. 1 and 7. The air in rear of pistons 46 and 54 is permitted to leak through leak ports 45' and 45 and valve casing outlets 43 and 74, respectively. Throughout the short initial movement of the lever 3 and rod 22 the brake is thrown off and the clutch is thrown on and a desired throttle opening or "overlap of sequence" is permitted to afford small gas feed during final engagement of the clutch.

While I have shown and described a preferred form of my invention for the purpose of illustration, it is to be understood that various modifications thereof are contemplated such as will fall within the scope of the claims which follow.

What I claim is:

1. In a vehicle, in combination, a power plant for driving said vehicle, a brake, means for holding said brake engaged, fluid pressure responsive means for disengaging said brake, a clutch, fluid suction responsive means for disengaging said clutch, separate sources of fluid pressure and fluid suction, a valve for controlling application of fluid pressure and fluid suction to said respectvie responsive means, and an accelerator lever connected to said valve for applying fluid pressure and suction from said sources to successively disengage or engage said clutch and brake.

2. In a device as set forth in claim 1, wherein the sources of fluid pressure and suction are derived from operation of the power plant.

3. In a vehicle, in combination, a clutch, a brake, means for holding said brake engaged, a casing, pistons in said casing, a piston rod connected to one of said pistons, means for operably connecting said rod to said brake, another of said pistons being slidably mounted on said rod and operably connected to said clutch, and means for supplying fluid power means to said casing for selectively moving said pistons.

4. In a vehicle, in combination, a clutch, a brake, a casing, a pair of pistons mounted in axial alignment within said casing, means for operatively connecting said pistons respectively to said clutch and brake, a fluid power supply, and a valve for selectively controlling application of fluid power to said pistons for moving either of said pistons.

5. In a device as set forth in claim 4, an accelerator lever, a throttle operably associated with said lever, said valve being movable in response to movement of said lever.

6. In a vehicle, in combination, a brake, a clutch, a fluid power supply means, a valve for controlling said fluid power supply means, a casing, pistons in said casing, said pistons being successively movable by said fluid power means in response to movement of said valve, means for connecting one of said pistons to said brake, means for connecting the other of said pistons to said clutch, an accelerator lever and means for connecting said lever to said valve.

7. In a vehicle, in combination, a brake, a brake cylinder, a clutch, a clutch cylinder, pistons in said cylinders connected respectively to said brake and clutch, a fluid power supply means, a valve for controlling said fluid power means, said pistons being movable by said fluid power supply means in response to movement of said valve, a casing for said valve, an accelerator lever, an accelerator rod movable by said lever and passing through said casing and being operably connected to said valve.

8. In a device as set forth in claim 7, a throttle valve, said rod being operably connected to said throttle valve.

9. In a device as set forth in claim 7, a throttle valve, a loose connection between said valve and the accelerator rod, said valve being movable by said accelerator rod after the accelerator rod and valve have moved to a position to permit movement of the brake operating means to release the brake.

10. In a device as set forth in claim 7, spring means for moving said valve during movement of said accelerator rod.

11. A brake control for power operated vehicles comprising a control lever, a fluid circulating system, a piston valve for controlling the flow of fluid through said system, a valve casing, said piston valve and casing being provided with axially aligned openings, an accelerator rod slidably positioned in said openings and connected to said lever, said valve being movable in response to movement of said rod, clutch operating means, brake operating means, the movement of said valve controlling fluid flow to operate both of said means.

12. In a device as set forth in claim 7, a detachable connection between said lever and accelerator rod, said connection being automatically released upon excessive motion of said lever in a direction to open said throttle valve.

13. In a vehicle comprising a brake and a clutch, a fluid supply system, brake and clutch operating means, a valve for controlling fluid flow from said supply to control said operating means, a lever for permitting movement of said valve in one direction, means for retracting said valve, a throttle movable in response to movement of said lever, detachable means for connecting said lever and valve, means for automatically disconnecting said lever from said valve after movement of the throttle to a predetermined maximum opening thereby permitting the retracting means to restore the valve to its original position.

14. In a vehicle, a source of fluid supply, a casing, a pair of pistons in said casing, control means for admitting fluid to said casing to move said pistons successively, one piston being mounted on a piston rod and the other piston being slidable on said piston rod, said other piston being connected to a second piston rod, a brake and a clutch, and means for operably connecting the brake and clutch respectively to said piston rods.

15. In a vehicle having a brake, a clutch, and an accelerator lever, means to retain the brake engaged, a throttle valve, means operatively responsive to initial movement of said lever in one direction for releasing the brake and permitting the clutch to engage, means for opening said valve upon further movement of said lever in the same direction, and means for automatically resetting said brake and closing said valve upon continued movement of the lever in the same direction to a predetermined position.

16. In a vehicle in combination, a clutch, a brake, pistons operably connected respectively to said clutch and brake, a source of fluid power supply, a valve for controlling flow of fluid from said supply to act upon said pistons, a gas accelerator lever operably connected to said valve and being movable from its initial position and timed to cut off fluid supply to said pistons, said valve in its retarded position corresponding to initial position of the lever permitting supply of fluid to said pistons to move same to positions respectively to positively disengage said clutch and positively engage said brake and auxiliary means for automatically tending to apply the brakes at all times.

17. In a device as set forth in claim 16 wherein the valve is movable by initial movement of the lever to cut off fluid supply to the pistons to permit engagement of the clutch and disengagement of the brake.

18. In a device as set forth in claim 16, means for moving the valve by initial movement of the lever to a position to cut off fluid supply to the pistons to permit engagement of the clutch and disengagement of the brake, a throttle valve, and means operably responsive to movement of said lever in the same direction to vary the amount of opening of said throttle valve.

19. In a device as set forth in claim 4 wherein the valve is provided with two ports and the source of fluid supply is derived from the vehicle engine, the valve in one position and while the engine is idling permitting fluid suction to act on the pistons to set the brakes and release the clutch.

20. In a device as set forth in claim 6, wherein the accelerator lever is detachably connected to a gas throttle control, said connection being automatically released upon excessive motion of the lever in a direction to move the throttle control to open the throttle.

21. In a vehicle, a casing, a piston rod extending within said casing, a brake, means for operably connecting said brake to said rod, a pair of pistons on said rod within the casing, means to hold said brake engaged, sources of fluid pressure and fluid suction, and means to selectively admit fluid suction to one of said pistons or fluid pressure to the other piston whereby to force said rod in one direction to assist in applying said brake or in another direction to disengage said brake in opposition to said brake holding means.

CARL R. LARSON.